United States Patent
Feller et al.

(10) Patent No.: US 11,117,315 B2
(45) Date of Patent: Sep. 14, 2021

(54) ADDITIVE MANUFACTURING CARRIER PLATFORM WITH WINDOW DAMAGE PROTECTION FEATURES

(71) Applicant: Carbon, Inc., Redwood City, CA (US)

(72) Inventors: Bob E. Feller, San Mateo, CA (US); Gregory W. Dachs, II, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 268 days.

(21) Appl. No.: 16/359,193

(22) Filed: Mar. 20, 2019

(65) Prior Publication Data

US 2019/0291343 A1  Sep. 26, 2019

Related U.S. Application Data

(60) Provisional application No. 62/646,097, filed on Mar. 21, 2018.

(51) Int. Cl.
| | | |
|---|---|---|
| *B29C 64/129* | (2017.01) | |
| *B29C 64/393* | (2017.01) | |
| *B33Y 50/02* | (2015.01) | |
| *B29C 64/264* | (2017.01) | |
| *B29C 64/245* | (2017.01) | |
| *B29C 64/124* | (2017.01) | |
| *B29C 64/20* | (2017.01) | |

(Continued)

(52) U.S. Cl.
CPC .......... *B29C 64/129* (2017.08); *B29C 64/264* (2017.08); *B29C 64/393* (2017.08); *B33Y 50/02* (2014.12); *B29C 64/124* (2017.08); *B29C 64/135* (2017.08); *B29C 64/20* (2017.08); *B29C 64/245* (2017.08); *B33Y 30/00* (2014.12)

(58) Field of Classification Search
CPC ... B29C 64/129; B29C 64/264; B29C 64/393; B29C 64/124; B29C 64/135; B29C 64/245; B29C 64/20; B33Y 50/02; B33Y 30/00
USPC ........................................................ 264/401
See application file for complete search history.

(56) References Cited

U.S. PATENT DOCUMENTS

| | | |
|---|---|---|
| 5,096,530 A | 3/1992 | Cohen |
| 5,122,441 A | 6/1992 | Lawton et al. |
| 5,236,637 A | 8/1993 | Hull |

(Continued)

FOREIGN PATENT DOCUMENTS

| | | |
|---|---|---|
| WO | 2001/72501 | 10/2001 |
| WO | 2011/086450 | 7/2011 |

OTHER PUBLICATIONS

Dendukuri et al., Stop-flow lithography in a microfluidic device, Lab Chip, 2007, 7, 818-828, published online May 21, 2007.

(Continued)

*Primary Examiner* — Joseph S Del Sole
*Assistant Examiner* — Lawrence D. Hohenbrink, Jr.
(74) *Attorney, Agent, or Firm* — Myers Bigel, P.A.

(57) ABSTRACT

A carrier plate assembly for use in producing a three-dimensional object by bottom-up stereolithography includes: (a) an upper support; (b) an adhesion plate having a substantially flat planar lower adhesion surface, on which surface the three-dimensional object can be formed; (c) at least one energy absorber interconnecting the upper support and the adhesion plate; and (d) a carrier lock portion connected to the upper support.

10 Claims, 2 Drawing Sheets

(51) Int. Cl.
*B33Y 30/00* (2015.01)
*B29C 64/135* (2017.01)

(56) References Cited

U.S. PATENT DOCUMENTS

| | | | |
|---|---|---|---|
| 5,345,391 | A | 9/1994 | Hull et al. |
| 5,391,072 | A | 2/1995 | Lawton et al. |
| 5,529,473 | A | 6/1996 | Lawton et al. |
| 7,438,846 | B2 | 10/2008 | John |
| 7,709,544 | B2 | 5/2010 | Doyle et al. |
| 7,845,930 | B2 | 12/2010 | Shkolnik et al. |
| 7,892,474 | B2 | 2/2011 | Shkolnik et al. |
| 8,110,135 | B2 | 2/2012 | El-Siblani |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,360,757 | B2 | 6/2016 | Desimone et al. |
| 9,498,920 | B2 | 11/2016 | Desimone et al. |
| 9,764,513 | B2 | 9/2017 | Stampfl et al. |
| 9,993,974 | B2 | 6/2018 | Desimone et al. |
| 10,016,938 | B2 | 7/2018 | Desimone et al. |
| 10,093,064 | B2 | 10/2018 | Desimone et al. |
| 10,144,181 | B2 | 12/2018 | Desimone et al. |
| 10,144,205 | B2 | 12/2018 | El-Siblani |
| 10,150,253 | B2 | 12/2018 | Desimone et al. |
| 10,232,605 | B2 | 3/2019 | Desimone et al. |
| 10,596,755 | B2 | 3/2020 | Desimone et al. |
| 10,611,080 | B2 | 4/2020 | Dachs, II et al. |
| 10,618,215 | B2 | 4/2020 | Desimone et al. |
| 2008/0179787 | A1 | 7/2008 | Sperry et al. |
| 2008/0226346 | A1 | 9/2008 | Hull et al. |
| 2010/0100222 | A1 | 4/2010 | Skubic et al. |
| 2011/0089610 | A1 | 4/2011 | El-Siblani et al. |
| 2012/0328726 | A1 | 12/2012 | Zenere |
| 2013/0292862 | A1 | 11/2013 | Joyce |
| 2013/0295212 | A1 | 11/2013 | Chen et al. |
| 2014/0052288 | A1 | 2/2014 | El-Siblani et al. |
| 2015/0064298 | A1 | 3/2015 | Syao |
| 2015/0151489 | A1 | 6/2015 | Elsey |
| 2015/0331402 | A1 | 11/2015 | Lin et al. |
| 2015/0360419 | A1 | 12/2015 | Willis et al. |
| 2016/0046075 | A1 | 2/2016 | Desimone et al. |
| 2016/0193786 | A1 | 7/2016 | Moore et al. |
| 2016/0200052 | A1* | 7/2016 | Moore .......... B29C 64/245 264/401 |
| 2016/0303795 | A1 | 10/2016 | Liu et al. |
| 2017/0100897 | A1 | 4/2017 | Chen et al. |
| 2017/0129167 | A1 | 5/2017 | Castanon |
| 2017/0129169 | A1 | 5/2017 | Batchelder et al. |
| 2017/0173881 | A1* | 6/2017 | Dachs, II .......... B33Y 10/00 |
| 2018/0015669 | A1 | 1/2018 | Moore et al. |
| 2018/0071976 | A1 | 3/2018 | Tumbleston et al. |
| 2018/0071977 | A1 | 3/2018 | Tumbleston et al. |
| 2018/0133959 | A1 | 5/2018 | Moore et al. |
| 2019/0061246 | A1 | 2/2019 | Feller et al. |
| 2019/0126547 | A1 | 5/2019 | Desimone et al. |
| 2019/0337223 | A1 | 11/2019 | Feller et al. |
| 2019/0389127 | A1 | 12/2019 | Desimone et al. |
| 2020/0139617 | A1 | 5/2020 | Desimone et al. |

OTHER PUBLICATIONS

Dendurkuri et al., Modeling of Oxygen-Inhibited Free Radical Photopolymerization in PDMS Microfluidic Device, Macromolecules, 2008, 41 (22), 8547-8556, published Oct. 21, 2008.

Yasuda et al., Permeability of Polymer Membranes to Dissolved Oxygen, pp. 1314-1316 (1966) Journal of Polymer Science, vol. 4.

Stern, S.A., The 'Barrer' Permeability Unit, pp. 1933-1934 (1968) Journal of Polymer Science, Part A-2, vol. 6.

Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.

Y. Pan et al., J. Manufacturing Sci. and Eng. 134, 051011-1 (Oct. 2012).

J. Tumbleston et al., Continuous liquid interface production of 3d objects, Science 347, 1349-1352 (published online Mar. 16, 2015).

* cited by examiner

ADDITIVE MANUFACTURING CARRIER PLATFORM WITH WINDOW DAMAGE PROTECTION FEATURES

RELATED APPLICATIONS

This application claims priority from U.S. Provisional Application No. 62/646,097, filed Mar. 21, 2018, the disclosure of which is hereby incorporated herein in its entirety.

FIELD OF THE INVENTION

The present invention concerns additive manufacturing, and particularly concerns carrier platforms for bottom-up stereolithography which aid in protecting the optically transparent window of such apparatus from damage.

BACKGROUND OF THE INVENTION

A group of additive manufacturing techniques sometimes referred to as "stereolithography" create a three-dimensional object by the sequential polymerization of a light polymerizable resin. Such techniques include "bottom-up" techniques, where light is projected into the resin onto the bottom of the growing object through a light transmissive window (sometimes referred to as a "basement" or "build plate").

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al. and J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

The introduction of CLIP has in turn led to development of a variety of different windows for bottom up stereolithography. Examples include, but are not limited to, those shown in:

- J. DeSimone et al., Three-Dimensional Printing with Supported Build Plates, US Patent Application Pub. No. US 2016/0046075 (Published Feb. 18, 2016);
- D. Moore et al., Three-Dimensional Printing with Build Plates Having a Rough or Patterned Surface, US Patent Application Pub. No. US 2016/0193786 (Jul. 7, 2016);
- D. Moore et al., Build Plates for Continuous Liquid Interface Printing Having Permeable Base and Adhesive for Increasing Permeability (PCT Application Pub. No. WO 2016/123499);
- D. Moore et al., Build Plates for Continuous Liquid Interface Printing Having Permeable Sheets (PCT Application Pub. No. WO 2016/123506);
- D. Moore et al., Three-Dimensional Printing with Build Plates having Surface Topologies for Increasing Permeability and Related Methods (PCT Application Pub. No. WO 2016/115236);
- J. Tumbleston et al., Three-Dimensional Printing with Reduced Pressure Build Plate Unit (PCT Application Pub. No. WO 2016/149097);
- J. Tumbleston et al., Three-Dimensional Printing with Flexible Build Plates (PCT Application Pub. No. WO 2016/149104);
- B. Feller et al., Three-Dimensional Printing with Build Plates Having Reduced Pressure and/or Channels for Increased Fluid Flow (PCT Application Pub. No. WO 2018/006029); and
- B. Feller et al., Three-Dimensional Printing Method and Apparatus for Reducing Bubbles by De-Gassing Through Build Plate (PCT Application Pub. No. WO 2018/006018).

The choice of any particular window design for use in a particular apparatus depends, in turn, on factors such as window area, resin type most commonly used, average desired speed of production, average desired accuracy of production, etc. In some cases, the window has a fragile or delicate top surface, typically formed from an organic polymer such as a fluoropolymer, or possibly a hydrogel. In such cases, the window is susceptible to damage from particles or grit in the resin, when the object carrier of the stereolithography apparatus is first lowered down to its start position in the resin—a position close to, but preferably not contacting, the top surface of the window itself. Since the windows are an important component of the overall apparatus, approaches to protecting the window from damage by such particulates would be useful.

SUMMARY OF THE INVENTION

A first aspect of the present invention is a carrier plate assembly for use in producing a three-dimensional object by bottom-up stereolithography. The carrier plate assembly includes: (a) an upper support; (b) an adhesion plate having a substantially flat planar lower adhesion surface, on which surface the three-dimensional object can be formed; (c) at least one energy absorber (e.g., shock absorber) interconnecting the upper support and the adhesion plate; and (d) a carrier lock portion connected to the upper support.

In some embodiments, the energy absorber comprises at least one, or a plurality, of elastomeric polymer buffers, compressible springs, pneumatic shock absorbers, hydraulic shock absorbers, or a combination thereof.

In some embodiments, the energy absorber comprises an elastomeric polymer layer between the upper support and the adhesion plate, the elastomeric polymer layer optionally configured as a compressible lattice.

In some embodiments, the lock portion comprises a nut, bolt, cam, gate, mortise, tenon, or combination thereof.

In some embodiments, the adhesion surface has a plurality of channels or openings formed therein (e.g., configured to reduce viscous suction force between the plate and polymerizable resin, and/or configured to facilitate the flow of wash liquid to the object during post-production washing of the part in a wash liquid).

In some embodiments, the resiliency or compressibility of the energy absorber is fixed; in other embodiments, the resiliency or compressibility of the shock absorber is adjustable.

In some embodiments, the energy absorber is preloaded.

A further aspect of the invention is a bottom-up stereolithography apparatus, comprising: (a) an optically transparent build window, the window including a rigid base and a polymer layer on the base; (b) an elevator assembly positioned above the window, the elevator assembly including an elevator lock portion; (c) a light source positioned below the window; (d) a controller operatively associated with the light source and the elevator assembly; and (e) a carrier plate assembly as described herein connected to the elevator assembly by engagement of the carrier lock portion to the elevator lock portion. The polymer layer may, for example, comprise an oxygen permeable layer (e.g., an oxygen-permeable polymer, such as a fluoropolymer), a hydrogel, etc., including combinations thereof.

G. Dachs et al., Three-Dimensional Printing using Selectively Lockable Carriers, US Patent Application Pub. No. US 2017/0173881, describes carrier plates for bottom-up stereolithography that contact the window in an unlocked state for alignment purposes, and then lock the carrier in an aligned state. The inclusion of shock absorbers or buffers in the carrier plate for the purpose of protecting the window from damage by grit or particles in the polymerizable resin is neither suggested nor described.

DETAILED DESCRIPTION OF ILLUSTRATIVE EMBODIMENTS

Figure 1:
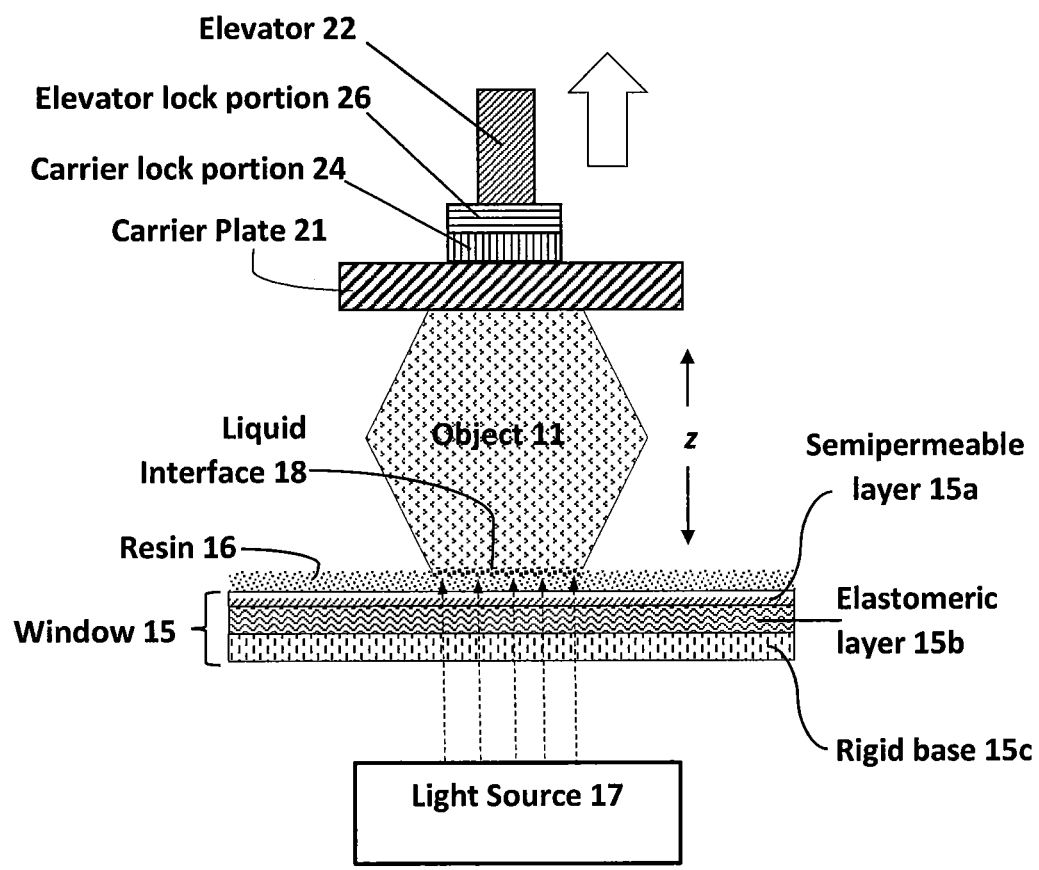
FIG. 1 is a schematic diagram of a bottom-up stereolithography system, in which the window includes an elastomeric layer.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Like numbers are assigned to analogous elements in the Figures herein and discussed below, generally differentiated by an alphabetic suffix or an apostrophe.

1. Additive Manufacturing Methods and Apparatus.

Additive manufacturing of objects is preferably carried out with polymerizable resins by additive manufacturing, particularly stereolithography, and preferably bottom-up stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. Such techniques typically involve projecting light through a window above which a pool of resin (or polymerizable liquid) is carried. A general purpose or functional part carrier is typically positioned above the window and above the pool, on which the growing object is produced.

In some embodiments of the present invention, the object is formed by continuous liquid interface production (CLIP). CLIP is known and described in, for example, PCT Applications Nos. PCT/US2014/015486 (published as U.S. Pat. No. 9,211,678 on Dec. 15, 2015), PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018).

In some embodiments, the additive manufacturing apparatus can be a Carbon, Inc. M1 or M2 apparatus implementing continuous liquid interface production, available from Carbon, Inc., 1089 Mills Way, Redwood City, Calif. 94063 USA.

2. Resins.

Resins, or photopolymerizable liquids, used in carrying out the methods of the invention, can be conventional resins, or dual cure resins (that is, resins requiring further cure following additive manufacturing, such as a baking step). Numerous suitable resins are known and include, but are not limited to those described in the references above. In some embodiments, dual cure resins such as described in U.S. Pat. No. 9,453,142 or 9,598,606 to Rolland et al., can be used.

In some embodiments, the resin is one which, when polymerized to produce the model and die, produces a model and die comprised of poly(acrylate), poly(methacrylate), poly(urethane acrylate), poly(urethane methacrylate), poly(epoxy acrylate), or poly(epoxy methacrylate).

In some embodiments, the resin is one which, when polymerized to produce the model and die, produces a model and die comprising or consisting of a polymer having: a tensile modulus of 1200 or 1600 MPa to 3000 MPa, or more; an elongation at break of 2% to 100 or 140%, or more; a flexural strength of 40 or 60 MPa, to 100 or 120 MPa, or more; and/or a flexural modulus (chord, 0.5%-1% strain) of 1500 or 2000 MPa, to 3000 MPa, or more.

Particular examples of suitable resins include, but are not limited to, Carbon, Inc., UMA resins (particularly PR25 resin in the UMA resin family), as well as Carbon, Inc. RPU and EPX dual cure resins, available from Carbon, Inc., 1089 Mills Way, Redwood City, Calif. 94063 USA.

3. Post-Production Steps.

As noted above, aspects of the invention involve washing the object, and then (depending on the choice of resin) further curing the object.

Washing.

After the intermediate object is formed, it is optionally washed (e.g., with an organic solvent), optionally dried (e.g., air dried) and/or rinsed (in any sequence).

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Any suitable cleaning apparatus may be used, including but not limited to those described in U.S. Pat. Nos. 5,248,456; 5,482,659, 6,660,208; 6,996,245; and 8,529,703.

A preferred wash apparatus is a Carbon, Inc. smart part washer, available from Carbon, Inc., 1089 Mills Way, Redwood City, Calif. 94063 USA. Thus in some embodiments, the wash step, when included, may be carried out by immersing the object in a wash liquid such as described above, with agitation (e.g., by rotating the composite article in the wash liquid), optionally but preferably with the wash step carried out in a total time of 10 minutes or less.

Further Curing.

Further (or second) curing may be carried out by any suitable technique, including but not limited to those described in U.S. Pat. No. 9,453,142. In a preferred embodiment, the further curing is carried out by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the object at ambient temperature for a sufficient time to effect further cure—is in some embodiments preferred. Ovens may be batch or continuous (conveyor) ovens, as is known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 250° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (see, e.g., U.S. Pat. No. 4,785,075).

4. Methods and Apparatus with Window-Protection Features.

FIG. 1 schematically illustrates a method and apparatus of bottom-up stereolithography, in which an object 11 is formed from a light polymerizable resin 16 at a liquid interface 18 between the two. The apparatus, which may incorporate elements such as micromirror arrays as described in connection with the apparatus discussed above, includes a carrier plate 21 on which the object 11 is formed, and a window 15 on which the polymerizable resin 16 rests. A light source (e.g., a micromirror array and an ultraviolet light source) 17 is positioned beneath the window, and an elevator 22 is positioned above the carrier plate and window, for advancing the carrier plate 21 away from the window 15 as the object 11 is produced in the z direction (although alternatively, the elevator can be static, and the window and light source can be lowered away from the carrier plate).

The window 15 includes a semipermeable top layer 15*a*, rigid base 15*c*, and an intervening elastomeric layer 15*b*. The top layer can be formed of a fluoropolymer material, the base can be formed of glass, sapphire, or the like, and the elastomeric layer may be formed of a silicone material. Additional adhesive layers can be included as necessary. The elastomeric layer provides some cushioning which serves to protect the top layer. Note also that fluid flow channels can be included in the window to enhance the flow of a polymerization inhibitor, typically oxygen, to the top of the window.

Figure 2:
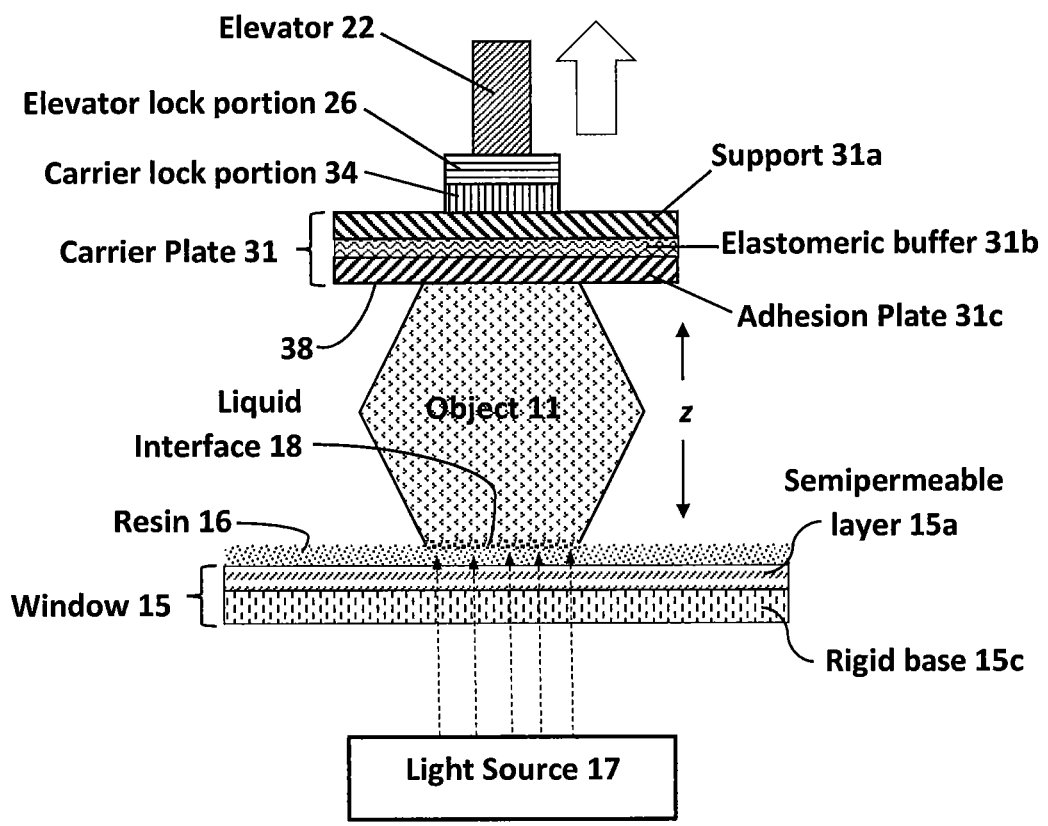
FIG. 2 is schematic diagram of a bottom-up stereolithography system, in which the window does not include an elastomeric layer, but an elastomeric buffer has been included in the carrier plate assembly.

The apparatus of FIG. 2 is similar to that of FIG. 1, except (for purposes of illustration, and not to be limiting of the invention) the elastomeric layer is no longer included in the window 15 (of course, the present invention can provide additional protection to the top layer of windows even when they include a elastomeric layer therein). In the apparatus of FIG. 2, the carrier plate 31 includes an upper support 31*a*, and a lower adhesion plate 31*c*, with at least one energy absorber 31*b* such as at least one shock absorber connected between the two.

The energy or shock absorber illustrated in FIG. 2 may be an elastomeric polymer buffer 31*b*. Any suitable elastomeric polymer can be used, including but not limited to silicone and polyurethane polymers. The polymer buffer can take any suitable configuration, including as a continuous sheet of material, or a plurality of separate, shaped, buffer segments. The polymer buffer(s) may be solid, or in the form of a regular or irregular lattice or foam (e.g., a compression lattice). The polymer buffer(s) may be fastened to the adhesion plate 31*c* and the upper support 31*a* in any suitable manner, such as with an adhesive, with mechanical fasteners, etc., including combinations thereof. Also, while an elastomeric polymer energy or shock absorber is currently preferred, other types of energy or shock absorbers can be used, including but not limited to compressible springs (e.g., metallic springs), pneumatic shock absorbers, hydraulic shock absorbers, etc., including combinations thereof. Thus, in some embodiments, the resiliency or compressibility of the energy or shock absorber may be fixed, while in other embodiments, the resiliency or compressibility of the energy or shock absorber may be adjustable (e.g., by adding or bleeding gas or liquid from a pneumatic or hydraulic shock absorber, altering pre-load on springs or elastomeric polymer buffers, etc.). The energy or shock absorber may be preloaded. This may prevent the carrier plate from moving (e.g., tilting) until a threshold force is reached. For example, if the energy absorber includes a spring coil over shock absorber mechanism, the spring may push the shock absorber downward with a resting force even if there is no load on the mechanism. Any load "squeezing" the mechanism must overcome the resting spring force before the mechanism, and hence the carrier plate, moves.

The energy or shock absorber may provide compliance, created for example by at least one spring or sufficiently flexible member or structure. The energy or shock absorber may provide damping, created for example by the movement of a fluid through an orifice or by two surfaces rubbing against one another. The energy or shock absorber may provide a combination of compliance and damping, created for example by a visco-elastic polymeric pad or lattice.

Note that the carrier plate adhesion surface 38 may be completely continuously flat and planar, or may have a plurality of channels or openings formed therein (e.g., configured to reduce viscous suction force between the plate and polymerizable resin, and/or configured to facilitate the flow of wash liquid to the object during post-production washing of the part in a wash liquid).

A lock portion 34 on the carrier plate upper support 31*a* can be used to conveniently removably connect the carrier platform to the apparatus elevator 22 by corresponding elevator lock portion 26. Any suitable configuration of manual, or automated, lock elements can be used, including nuts, bolts, cams, gates, mortises, tenons, etc., including combinations thereof.

In use, the invention provides a method of protecting the build window of a bottom-up stereolithography apparatus from damage when initiating production of a three-dimensional object from a polymerizable liquid thereon. The method includes the steps of: providing an apparatus as described herein above; applying a polymerizable liquid to the polymer layer of the window; and then advancing the carrier plate assembly down to a predetermined start position adjacent to (but spaced away from) the window, and in contact with the polymerizable liquid, to initiate production of a three-dimensional object thereon. Damage to the polymer layer potentially caused by solid particles in the polymerizable liquid or on that window (which may otherwise be pressed down into the polymer layer and leave an impression, dent, or perforation therein), is reduced by compression of the at least one energy or shock absorber.

The foregoing is illustrative of the present invention, and is not to be construed as limiting thereof. The invention is defined by the following claims, with equivalents of the claims to be included therein.

We claim:

1. A bottom-up stereolithography apparatus, comprising:
   (a') an optically transparent build window, said window including a rigid base and a polymer layer on said base;
   (b') an elevator assembly positioned above said window, said elevator assembly including an elevator lock portion;
   (c') a light source positioned below said window;
   (d') a controller operatively associated with said light source and said elevator assembly; and
   (e') a carrier plate assembly comprising:
      (a) an upper support;
      (b) an adhesion plate having a substantially flat planar lower adhesion surface, on which surface said three-dimensional object can be formed;
      (c) at least one energy absorber interconnecting said upper support and said adhesion plate; and
      (d) a carrier lock portion connected to said upper support,
   wherein said carrier plate assembly is connected to said elevator assembly by engagement of said carrier lock portion to said elevator lock portion.

2. The apparatus of claim 1, wherein said polymer layer comprises an oxygen permeable layer or a hydrogel.

3. A method of protecting the build window of a bottom-up stereolithography apparatus from damage when initiating production of a three-dimensional object from a polymerizable liquid thereon, comprising the steps of:
   providing the apparatus of claim 1;
   applying a polymerizable liquid to said polymer layer of said window; and then
   advancing said carrier plate assembly down to a predetermined start position adjacent to but spaced away from said window, and in contact with said polymerizable liquid, to initiate production of a three-dimensional object thereon, wherein damage to said polymer layer potentially caused by solid particles in said polymerizable liquid or on said window is reduced by compression of said at least one energy absorber.

4. The method of claim 3, wherein said advancing step is followed by the step of stereolithographically producing the three-dimensional object between said carrier and said polymer layer from said resin.

5. The apparatus of claim 1, wherein said energy absorber comprises at least one, or a plurality, of elastomeric polymer buffers, compressible springs, pneumatic shock absorbers, hydraulic shock absorbers, or a combination thereof.

6. The apparatus of claim 1, said carrier lock portion comprising a nut, bolt, cam, gate, mortise, tenon, or combination thereof.

7. The apparatus of claim 1, said adhesion surface having a plurality of channels or openings formed therein configured to reduce viscous suction force between the adhesion plate and polymerizable resin, and/or configured to facilitate the flow of wash liquid to the three-dimensional object during post-production washing of the three-dimensional object in the wash liquid.

8. The apparatus of claim 1, wherein the resiliency or compressibility of said energy absorber is fixed or adjustable.

9. The apparatus of claim 1, wherein said energy absorber is preloaded.

10. A carrier plate assembly for use in producing a three-dimensional object by bottom-up stereolithography, said carrier plate assembly comprising:
(a) an upper support;
(b) an adhesion plate having a substantially flat planar lower adhesion surface, on which surface said three-dimensional object can be formed;
(c) at least one energy absorber interconnecting said upper support and said adhesion plate; and
(d) a carrier lock portion connected to said upper support, wherein said energy absorber comprises an elastomeric polymer layer between said upper support and said adhesion plate, said elastomeric polymer layer optionally configured as a compressible lattice.

* * * * *